United States Patent
Mohamed et al.

(10) Patent No.: US 11,765,238 B1
(45) Date of Patent: Sep. 19, 2023

(54) NON-TRANSLATED PORT OVERSUBSCRIBING FOR A PROXY DEVICE

(71) Applicant: Juniper Networks, Inc., Sunnyvale, CA (US)

(72) Inventors: Abdul Kadhar Jeelany Habeeb Mohamed, Chennai (IN); Hemachandran Karnam Mohan, Chittoor (IN); Girish Kumar Attimgere Lingaiah, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/845,538

(22) Filed: Jun. 21, 2022

(51) Int. Cl.
*H04L 67/141* (2022.01)
*H04L 67/56* (2022.01)
*H04L 61/2517* (2022.01)
*H04L 47/10* (2022.01)
*H04L 49/253* (2022.01)

(52) U.S. Cl.
CPC ............ *H04L 67/141* (2013.01); *H04L 47/10* (2013.01); *H04L 49/253* (2013.01); *H04L 61/2517* (2013.01); *H04L 67/56* (2022.05)

(58) Field of Classification Search
CPC ..... H04L 67/141; H04L 47/10; H04L 49/253; H04L 61/2517; H04L 67/56
See application file for complete search history.

(56) References Cited

U.S. PATENT DOCUMENTS

| | | | | |
|---|---|---|---|---|
| 6,141,689 | A | * 10/2000 | Yasrebi | H04L 67/133 709/228 |
| 9,055,139 | B1 | 6/2015 | Devireddy et al. | |
| 10,104,002 | B2 | * 10/2018 | Chau | H04L 47/34 |
| 10,659,569 | B1 | 5/2020 | Tourrilhes et al. | |
| 2004/0264378 | A1 | * 12/2004 | Kishore | H04L 49/15 370/235 |

(Continued)

OTHER PUBLICATIONS

Noction, "Oversubscription in Networking", Jul. 21, 2021, https://www.noction.com/blog/oversubscription-in-networking (Year: 2021).*

(Continued)

*Primary Examiner* — Ramy M Osman
(74) *Attorney, Agent, or Firm* — Harrity & Harrity, LLP (57) ABSTRACT

In some implementations, a proxy device may intercept a client session associated with a client device and a destination device. The proxy device may allocate a first port of the proxy device as a source port of a proxy session for the client session. The proxy device may determine, based on allocating the first port, whether session information associated with the proxy session would match session information associated with another proxy session. The proxy device may initiate the proxy session. A source port of the proxy session is the first port of the proxy device based on a determination that the session information associated with the proxy session would not match session information associated with another proxy session, or is a second port of the proxy device based on a determination that the session information associated with the proxy session would match session information associated with another proxy session.

17 Claims, 6 Drawing Sheets

(56) References Cited

U.S. PATENT DOCUMENTS

| | | | |
|---|---|---|---|
| 2005/0213506 A1* | 9/2005 | Wakumoto | H04L 45/28 370/237 |
| 2006/0212576 A1* | 9/2006 | Barkley | H04L 61/2517 709/226 |
| 2006/0259625 A1* | 11/2006 | Landfeldt | H04L 61/2514 709/227 |
| 2011/0122880 A1* | 5/2011 | Saito | H04L 61/2514 370/401 |
| 2013/0111038 A1 | 5/2013 | Girard | |
| 2013/0204988 A1 | 8/2013 | Grewal et al. | |
| 2018/0115501 A1* | 4/2018 | Reynolds | H04L 63/1416 |

OTHER PUBLICATIONS

Infra, "What is "oversubscription" in Networking?", Jun. 24, 2019, https://networkengineering.stackexchange.com/questions/60002/what-is-oversubscription-in-networking (Year: 2019).*
Extended European Search Report for Application No. EP22189320, dated May 19, 2023, 7 pages.

* cited by examiner

NON-TRANSLATED PORT OVERSUBSCRIBING FOR A PROXY DEVICE

BACKGROUND

A proxy device (also referred to as a proxy server) is a device that acts as a gateway between a client device and destination devices with which the client device may communicate via a network (e.g., the Internet). Put another way, the proxy device acts as in intermediary server separating the client device from the destination devices. In some deployments, a proxy device may be utilized to provide privacy and/or security for the client device.

SUMMARY

Some implementations described herein relate to a method. The method may include intercepting, by a proxy device, a client session associated with a client device and a destination device. The method may include allocating, by the proxy device, a first port of the proxy device as a source port of a proxy session for the client session. The method may include determining, by the proxy device and based on allocating the first port, whether session information associated with the proxy session would match session information associated with another proxy session. The method may include initiating, by the proxy device, the proxy session after determining whether the session information associated with the proxy session would match session information associated with another proxy session, where a source port of the proxy session is one of: the first port of the proxy device based on a determination that the session information associated with the proxy session would not match session information associated with another proxy session, or a second port of the proxy device based on a determination that the session information associated with the proxy session would match session information associated with another proxy session.

Some implementations described herein relate to a device. The device may include one or more memories and one or more processors. The device may be configured to intercept a first session associated with a first device and a second device. The device may be configured to allocate a first port of the device as a source port of a second session, the second session being associated with the first session. The device may be configured to determine, based on allocating the first port, whether session information associated with the second session would match session information associated with another session. The device may be configured to initiate the second session after determining whether the session information associated with the second session would match session information associated with another session, where a source port of the second session is one of: the first port of the device, based on a determination that the session information associated with the second session would not match session information associated with another session, or a second port of the device, based on a determination that the session information associated with the second session would match session information associated with another session.

Some implementations described herein relate to a non-transitory computer-readable medium that stores a set of instructions for a proxy device. The set of instructions, when executed by one or more processors of the proxy device, may cause the proxy device to allocate a first port of the proxy device as a source port of a proxy session for a client session associated with a client device and a destination device. The set of instructions, when executed by one or more processors of the proxy device, may cause the proxy device to initiate the proxy session with the destination device based on a determination of whether session information associated with the proxy session would match session information associated with another proxy session, where a source port of the proxy session is one of: the first port of the proxy device based on determining the session information associated with the proxy session would not match session information associated with another proxy session, or a second port of the proxy device based on determining the session information associated with the proxy session would match session information associated with another proxy session.

DETAILED DESCRIPTION

The following detailed description of example implementations refers to the accompanying drawings. The same reference numbers in different drawings may identify the same or similar elements.

In conventional operation, a proxy device (e.g., a web proxy) is configured to intercept a client session and originate a proxy session to a destination device associated with the client session. However, a quantity of proxy sessions that the proxy device can maintain is limited. For example, a proxy device with single egress interface may have a limitation of handling a maximum of 65,536 proxy sessions originated from the proxy device.

In one example, a client device with an Internet protocol (IP) address of 115.99.111.113 and using port 60026 initiates a client session in order to communicate with a first destination device (e.g., a first web server) with an IP address of 34.120.237.76 at port 443. Here, a proxy device with an IP address of 10.10.1.10 intercepts the client session, terminates the client session, and initiates a new proxy session from the proxy device to the first destination device using the IP address of the proxy device (10.10.1.10) and port 38095. Here, the quantity of available ports can scale up 65,536, meaning that the proxy device can support up to 65,536 proxy sessions. Thus, as client devices continue to initiate client sessions, the proxy device may run out of source ports to allocate to proxy sessions and, therefore, may not be able to initiate proxy sessions to destination devices. As a result, reliability of communication for a given client device may be reduced.

Some implementations described herein provide techniques and apparatuses for non-translated port oversubscribing for a proxy device. In some implementations, a proxy device may intercept a client session, and allocate a first port of the proxy device as a source port of a proxy session for the client session. The proxy device may then determine, based on allocating the first port, whether session information (e.g., a 5-tuple) associated with the proxy session would match session information associated with another proxy session, and may initiate the proxy session after the determination. Here, a source port of the proxy session may be the first port of the proxy device based on a determination that the session information associated with the proxy session would not match session information associated with another proxy session. Alternatively, the source port of the proxy session may be a second port of the proxy device based on a determination that the session information associated with the proxy session would match session information associated with another proxy session.

In some implementations, by utilizing the techniques and apparatuses described herein, the proxy device may handle multiple destination sockets (i.e., destination IP/destination port combinations) using a given source socket (i.e., a given proxy IP address/proxy port combination). That is, a given port of the proxy device can be allocated as a source port for multiple proxy sessions, effectively removing a session limitation (e.g., the 65,536 session limitation), thereby improving reliability of communication for a given client device via the proxy device. Additionally, the techniques and apparatuses described herein do not rely on translated port overloading (e.g., port overloading using network address translation (NAT) or port address translation (PAT)) to increase capability at the proxy device, meaning that processing overhead at the proxy device is reduced (e.g., as compared to a scenario in which NAT or PAT is applied). Additional details are provided below.

Figure 1A:
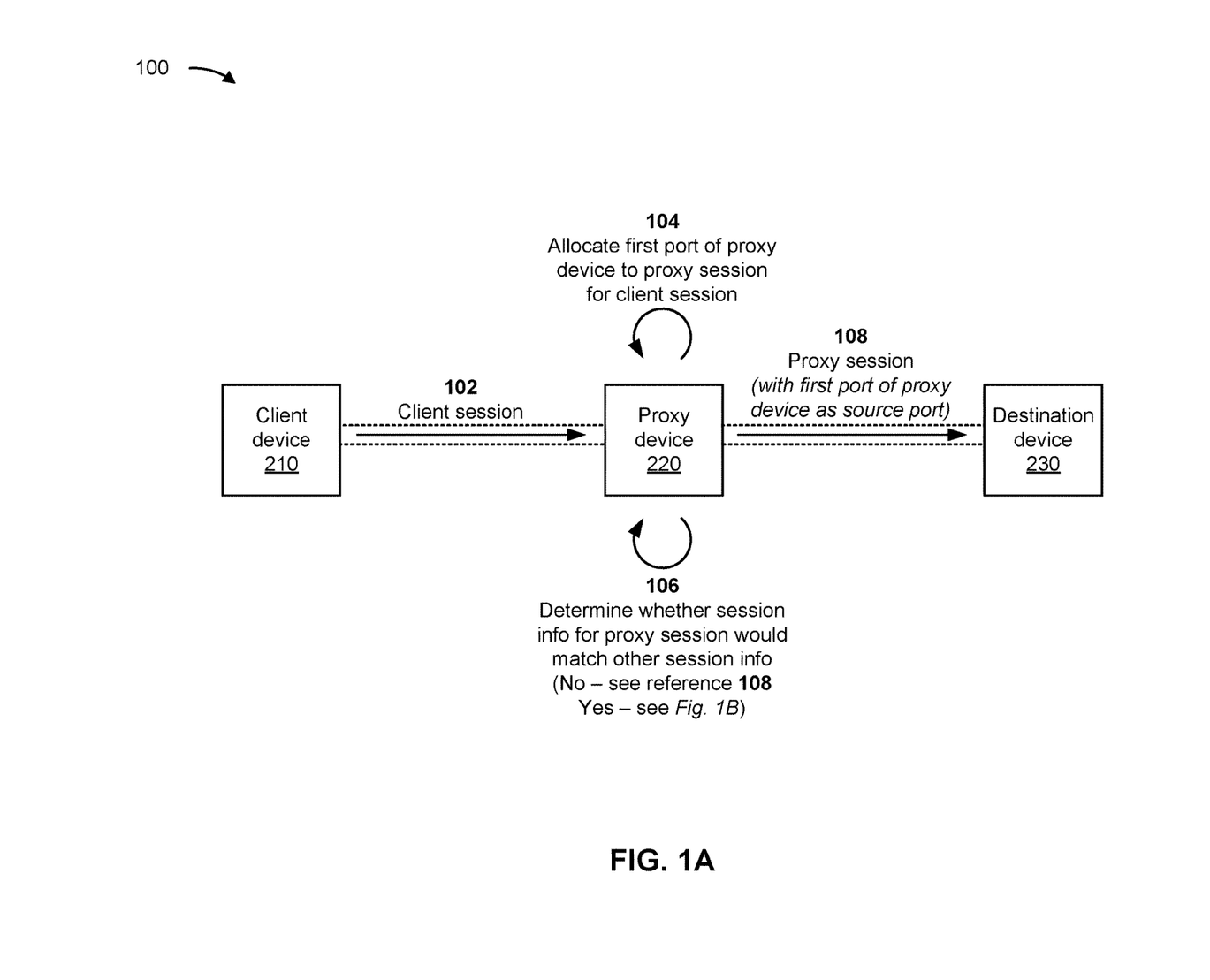
FIGS. 1A and 1B are diagrams of an example implementation associated with non-translated port oversubscribing for a proxy device.
Figure 1B:
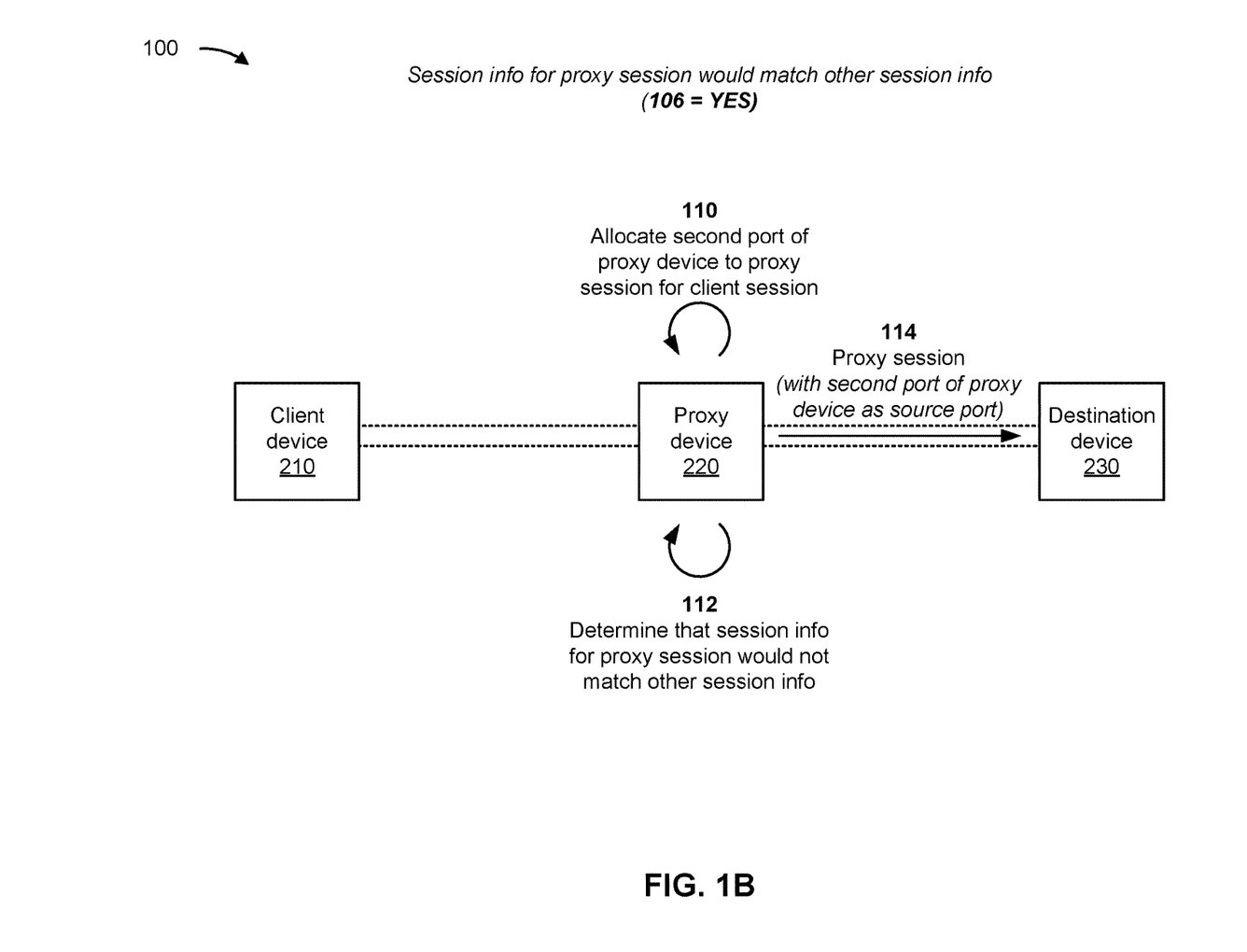

FIGS. 1A and 1B are diagrams of an example implementation 100 associated with non-translated port oversubscribing for a proxy device. As shown in FIGS. 1A and B, example implementation 100 includes a client device 210, a proxy device 220, and a destination device 230. These devices are described in more detail below in connection with FIGS. 2-4.

As shown in FIG. 1A by reference 102, the proxy device 220 may intercept a client session associated with the client device 210 and the destination device 230. For example, the proxy device 220 may receive, from the client device 210, an indication that the client device 210 is to initiate a session with the destination device 230. In some implementations, the indication may include a hypertext transfer protocol (HTTP) request.

In some implementations, the proxy device 220 may receive session information associated with the client session when intercepting the client session. For example the HTTP request may include the session information associated with the client session. The session information may include, for example, information indicating (1) a source address of the client session (e.g., an IP address of the client device 210), (2) a source port of the client session (e.g., a port of the client device 210), (3) a destination address of the client session (e.g., an IP address of the destination device 230), (4) a destination port of the client session (e.g., a port of the destination device 230), and/or (5) a protocol associated with the client session (e.g., transmission control protocol (TCP), IP, or the like). Thus, in some implementations, the session information includes a 5-tuple associated with the client session. In some implementations, the proxy device 220 terminates the client session based on intercepting the client session.

As shown by reference 104, the proxy device 220 may allocate a first port of the proxy device 220 as a source port of a proxy session for the client session. That is, in some implementations, the proxy device 220 may allocate a port of the proxy device 220 for use as a source port in association with initiating a proxy session corresponding to the client session. In some implementations, the proxy device 220 selects ports of the proxy device 220 to be allocated for proxy sessions in a sequential manner (e.g., such that ports are allocated in a particular order), in a randomized manner (e.g., such that ports are allocated in a random order), in a prioritized order (e.g., such that ports not currently being used for proxy sessions are allocated before ports being used), or in another manner configured on the proxy device 220.

In some implementations, the proxy device 220 may allocate the first port of the proxy device 220 as the source port for the proxy session based on a determination that the first port is not allocated to any proxy sessions. That is, in some implementations, the proxy device 220 may identify a port of the proxy device 220 that is not allocated to any proxy session, and may allocate the identified port as the source port for the proxy session. In this way, the proxy device 220 may in some implementations allocate unallocated ports of the proxy device 220 as source ports for proxy sessions before reusing a given allocated port of the proxy device 220 for another proxy session.

As shown by reference 106, the proxy device 220 may determine, based on allocating the first port, whether session information associated with the proxy session would match session information associated with another proxy session. For example, the proxy device 220 may determine session information (e.g., a 5-tuple) associated with a proxy session that would use the first port of the proxy device 220 as the source port for the proxy session. The proxy device 220 may then compare the session information to session information (e.g., 5-tuples) associated with other proxy sessions being supported by the proxy device 220).

As a particular example, the proxy device 220 may receive a 5-tuple, associated with the client session, that indicates a source address of the client session (e.g., an IP address of the client device 210, such as 115.99.111.113), a source port of the client session (e.g., a port of the client device 210, such as 60026), a destination address of the client session (e.g., an IP address of the destination device 230, such as 34.120.237.76), a destination port of the client session (e.g., a port of the destination device 230, such as 443), and a protocol associated with the client session (e.g., TCP/IP). In this example, the proxy device 220 uses a particular IP address of the proxy device 220 (e.g., 10.10.1.10) as a source address for the proxy session, and allocates a first port of the proxy device 220 (e.g., 38095) as the source port of the proxy session. Thus, in this example, the session information associated with the proxy session would be a 5-tuple that indicates the source address of the proxy session (e.g., 10.10.1.10— the IP address of the proxy device 220), the source port of the proxy session (e.g., 38095— the allocated first port of the client device 210), a destination address of the proxy session (e.g., 34.120.237.76— the IP address of the destination device 230), a destination port of the proxy session (e.g., 443— the port of the destination device 230), and a protocol associated with the proxy session (e.g., TCP/IP). Here, the proxy device 220 compares the 5-tuple associated with the proxy session to 5-tuples associated with other proxy sessions being supported by the proxy device 220 and determines whether any of the 5-tupes associated with the other proxy sessions match the 5-tuple associated with the proxy session.

In some implementations, the proxy device 220 determines that the session information associated with the proxy session would match session information associated with another proxy session when each item of information included in the session information associated with the proxy session (e.g., the source address, the source port, the destination address, the destination port, and the protocol) is identical to a corresponding item of information included in session information associated with another proxy session. Using the above example, the proxy device 220 would determine that the session information associated with the proxy session matches session information associated with another proxy session when the session information associated with the other session includes the same 5-tuple as that of the session information associated with the proxy session (e.g., 10.10.1.10, 38095, 34.120.237.76, 443, TCP/IP). Conversely, the proxy device 220 determines that the session information associated with the proxy session would not match session information associated with another proxy session when at least one item of information included in the session information associated with the proxy session is different from a corresponding item of information included in the session information associated with the other proxy session. Using the above example, the proxy device 220 would determine that the session information associated with the proxy session does not match session information associated with another proxy session when the session information associated with the other session includes a 5-tuple that differs from that of the session information associated with the proxy session (e.g., 10.10.1.10, 38095, 142.250.69.206, 443, TCP/IP). Thus, so long as at least one item of information, such as the destination address or the destination port, included in the session information associated with the proxy session is different from the corresponding item of information included in the session information associated with the other proxy session, the proxy device 220 determine that the session information associated with the proxy session does not match the session information associated with the other proxy session.

In some implementations, the proxy device 220 may compare the session information associated with the proxy session to session information associated with multiple other proxy sessions being supported by the proxy device 220 (e.g., such that the proxy device 220 can determine whether the session information associated with the proxy session matches session information associated with any proxy session being supported by the proxy device 220). For example, the proxy device 220 may compare the session information associated with the proxy session to session information for each other proxy session being supported by the proxy device 220 that uses the same source socket (i.e., source address and source port) as that which would be used by the proxy session.

In some implementations, the proxy device 220 may determine whether the session information associated with the proxy session would match session information associated with another proxy session based on a determination that the first port of the proxy device 220 is allocated to at least one proxy session. That is, in some implementations, the proxy device 220 may maintain port allocation information that identifies ports already allocated by the proxy device 220 (e.g., ports being used for other proxy sessions). Here, if the proxy device 220 determines that the first port of the proxy device 220 is allocated to at least one proxy session, then the proxy device 220 may determine whether the session information associated with the proxy session would match session information associated with the at least one other proxy sessions to which the first port is allocated (e.g., in the manner described above). Conversely, if the proxy device 220 determines that the first port of the proxy device 220 is not allocated to at least one proxy session, then the proxy device 220 may initiate the proxy session with the destination device 230, where a source port of the proxy session is the first port of the proxy device 220. That is, when the first port is not allocated to any proxy session, the proxy device 220 may proceed with initiating the proxy session using the first port without a need to compare the session information to session information associated with other proxy sessions.

As shown by reference 108, if the proxy device 220 determines that the session information associated with the proxy session would not match session information associated with another proxy session, then the proxy device 220 may initiate the proxy session with the destination device 230, where a source port of the proxy session is the first port of the proxy device. That is, the proxy device 220 may use the first port as the source port for the proxy session if the proxy device 220 determines that the session information associated with the proxy session would not match session information associated with another proxy session.

Conversely, with reference to FIG. 1B, if the proxy device 220 determines that the session information associated with the proxy session would match session information associated with another proxy session, then the proxy device 220 may in some implementations initiate the proxy session with the destination device 230, where a source port of the proxy session is a different port of the proxy device (e.g., a port of the proxy device 220 other than the first port).

For example, as shown by reference 110, the proxy device 220 may allocate the second port of the proxy device as the source port of the proxy session based on a determination that the session information associated with the proxy session would match session information associated with another proxy session. That is, the proxy device 220 may allocate a second (different) port as the source port for the proxy session based on a determination that the session information associated with the proxy session would match session information associated with another proxy session if the first port were to be used as the source port for the proxy session. In some implementations, the proxy device 220 may allocate the second port in a manner similar to that described above with respect to allocation of the first port (e.g., in a particular order, in a randomized order, in a prioritized order, or the like).

As shown by reference 112, after allocating the second port, the proxy device 220 may determine that the session information associated with the proxy session would not match session information associated with another proxy session. For example, the proxy device 220 may determine, based on allocating the second port, whether session information associated with the proxy session would match session information associated with another proxy session. As a particular example, the proxy device 220 may determine session information (e.g., a 5-tuple) associated with a proxy session that would use the second port of the proxy device 220 as the source port for the proxy session. The proxy device 220 may then compare the session information to session information (e.g., 5-tuples) associated with other proxy sessions being supported by the proxy device 220 in the manner described above. Here, the proxy device 220 may determine that the session information associated with the proxy session, when using the second port as the source port of the proxy session, would not match session information associated with another proxy session. In this scenario, as shown by reference 114, the proxy device 220 may initiate the proxy session with the destination device 230, where a source port of the proxy session is the second port of the proxy device. That is, the proxy device 220 may use the second port as the source port for the proxy session if the proxy device 220 determines that the session information associated with the proxy session would not match session information associated with another proxy session.

In an alternative scenario, the proxy device 220 may determine that the session information associated with the proxy session, when using the second port as the source port for the proxy session, would match session information associated with another proxy session. In such a scenario, the proxy device 220 may allocate a third port of the proxy device 220 as the source port of the proxy session and determine whether the session information associated with the proxy session, when using the third port as the source port for the proxy session, would match session information associated with another proxy session. In general, the proxy device 220 may repeat these operations until the proxy device 220 allocates a port of the proxy device 220 as the source port for the proxy session that would result in session information that would not match session information associated with another proxy session being supported by the proxy device 220.

In some implementations, the proxy device 220 stores the session information associated with the proxy session. For example, the proxy device 220 may store a 5-tuple associated with the proxy session based on initiating the proxy session (e.g., using the first port of the proxy device 220 as the source port or using the second port of the proxy device 220 as the source port). In some implementations, the proxy device 220 stores the session information to enable the proxy device 220 to compare session information associated with a proxy session to be established at a later time to session information associated with the proxy session in the manner described above.

In some implementations, the proxy device 220 may store mapping information that associates the proxy session with the client session. For example, based on initiating the proxy session (e.g., using the first port of the proxy device 220 as the source port or using the second port of the proxy device 220 as the source port), the proxy device 220 may store mapping information that associations the client session with the proxy session. In some implementations, the mapping information may include an indication that a session identifier of the client session is associated with a session identifier of the proxy session. In some implementations, the proxy device 220 uses the mapping information in association with routing traffic between the client device 210 and the destination device 230.

Notably, according to the implementations described herein, a source socket of the proxy session may in some cases match a source socket of one or more other proxy sessions initiated by the proxy device 220. That is, a given socket (e.g., a given source IP address and source socket pair) may be used for multiple proxy sessions initiated by the proxy device 220. In this way, any given port of the proxy device 220 (e.g., all 65,536 ports of the proxy device 220) may support multiple proxy sessions, thereby effectively removing a session limitation (e.g., the 65,536 session limitation) and improving reliability of communication.

As indicated above, FIGS. 1A and 1B are provided as an example. Other examples may differ from what is described with regard to FIGS. 1A and 1B. The number and arrangement of devices shown in FIGS. 1A and 1B are provided as an example. In practice, there may be additional devices, fewer devices, different devices, or differently arranged devices than those shown in FIGS. 1A and 1B. Furthermore, two or more devices shown in FIGS. 1A and 1B may be implemented within a single device, or a single device shown in FIGS. 1A and 1B may be implemented as multiple, distributed devices. Additionally, or alternatively, a set of devices (e.g., one or more devices) shown in FIGS. 1A and 1B may perform one or more functions described as being performed by another set of devices shown in FIGS. 1A and 1B.

Figure 2:
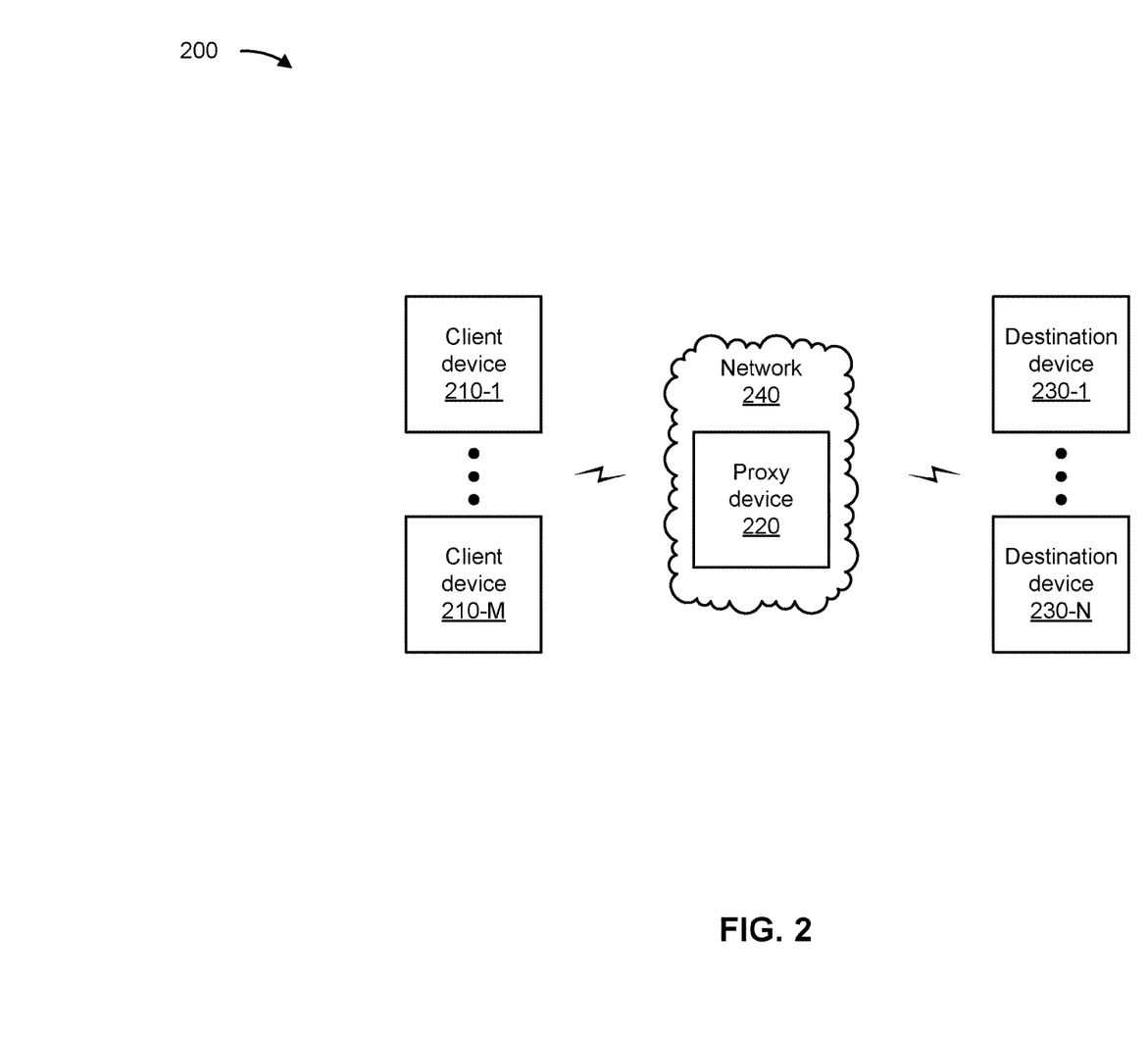
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more client devices 210 (shown as client device 210-1 through client device 210-M (M≥1)), a proxy device 220, one or more destination devices (shown as destination device 230-1 through destination device 230-N (N≥1)), and a network 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), or a similar type of device. In some implementations, client device 210 may receive network traffic from and/or may provide network traffic to other client devices 210, proxy device 220, and/or destination device 230, via network 240 (e.g., by routing packets using proxy device 220 as an intermediary).

Proxy device 220 includes one or more devices capable of receiving, processing, storing, routing, and/or providing traffic (e.g., a packet or other information or metadata) in a manner described herein. For example, proxy device 220 may include a router, such as a label switching router (LSR), a label edge router (LER), an ingress router, an egress router, a provider router (e.g., a provider edge router or a provider core router), a virtual router, or another type of router. Additionally, or alternatively, proxy device 220 may include a gateway, a switch, a firewall, a hub, a bridge, a reverse proxy, a server (e.g., a proxy server, a cloud server, or a data center server), a load balancer, and/or a similar device. In some implementations, proxy device 220 may be a physical device implemented within a housing, such as a chassis. In some implementations, proxy device 220 may be a virtual device implemented by one or more computer devices of a cloud computing environment or a data center. In some implementations, a group of proxy devices 220 may be a group of data center nodes that are used to route traffic flow through network 240.

Destination device 230 includes one or more devices capable of receiving, generating, storing, processing, and/or providing information, such as information described herein. For example, destination device 230 may include a laptop computer, a tablet computer, a desktop computer, a group of destination devices, or a similar type of device, associated with multicast traffic. In some implementations, destination device 230 may receive information from and/or transmit information (e.g., multicast traffic) to client device 210, via network 240 (e.g., by routing packets using proxy device 220 as an intermediary).

Network 240 includes one or more wired and/or wireless networks. For example, network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
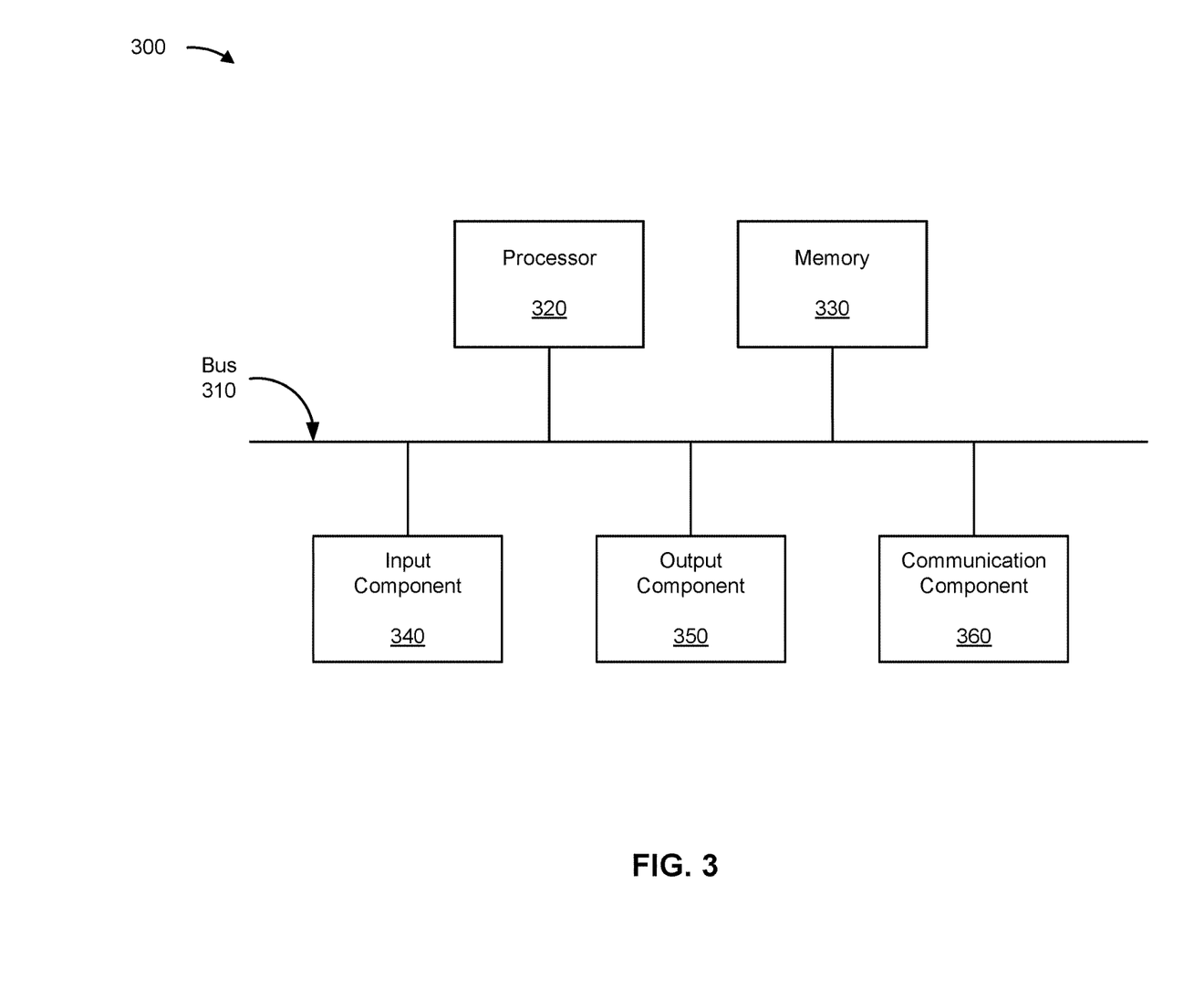
FIG. 3 is a diagram of example components of a device associated with non-translated port oversubscribing for a proxy device.

FIG. 3 is a diagram of example components of a device 300 associated with non-translated port oversubscribing for a proxy device. Device 300 may correspond to client device 210, proxy device 220, and/or destination device 230. In some implementations, client device 210, proxy device 220, and/or destination device 230 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
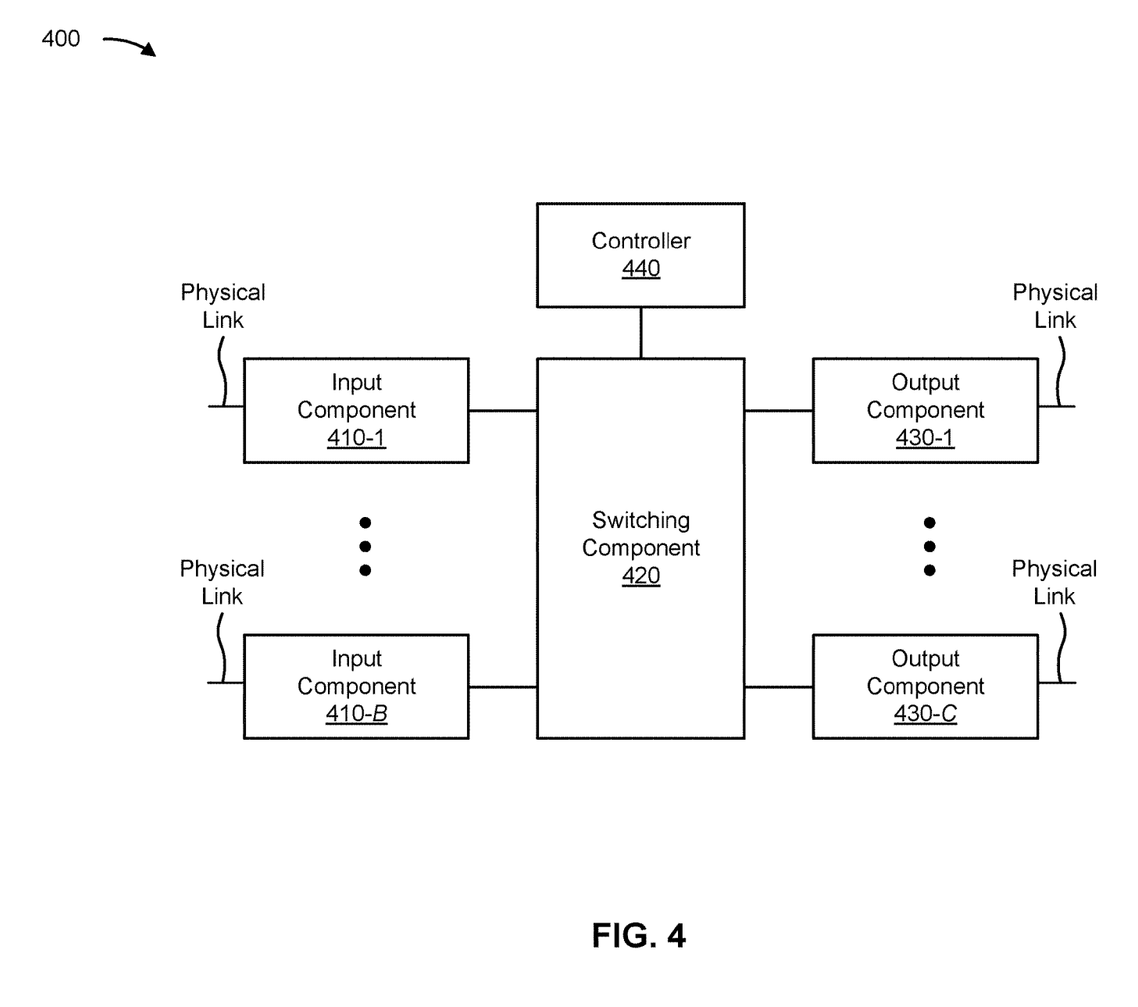
FIG. 4 is a diagram of example components of a device associated with non-translated port oversubscribing for a proxy device.

FIG. 4 is a diagram of example components of a device 400 associated with non-translated port oversubscribing for a proxy device. Device 400 may correspond to proxy device 220. In some implementations, proxy device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
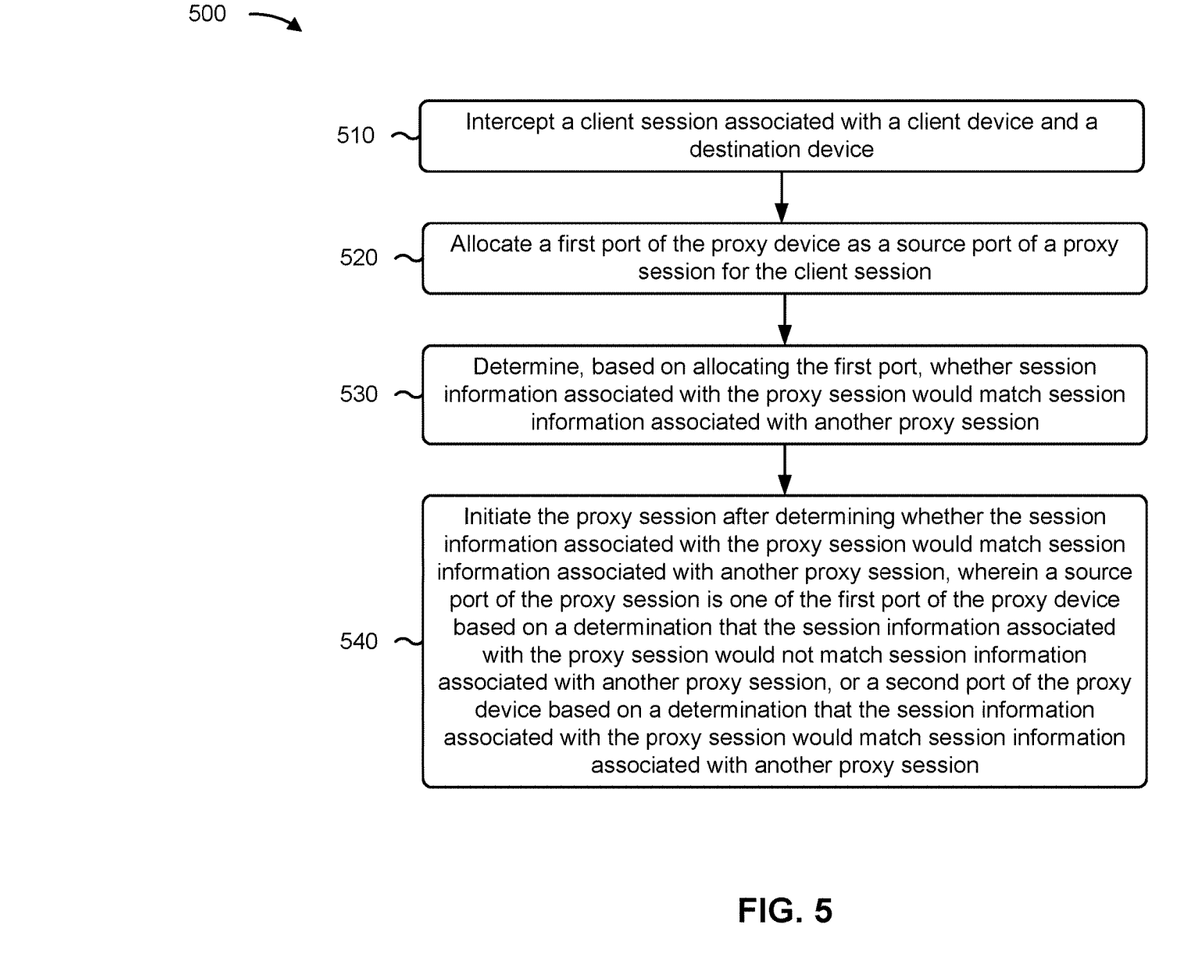
FIG. 5 is a flowchart of an example process associated with non-translated port oversubscribing for a proxy device.

FIG. 5 is a flowchart of an example process 500 associated with non-translated port oversubscribing for a proxy device. In some implementations, one or more process blocks of FIG. 5 are performed by a proxy device (e.g., proxy device 220). Additionally, or alternatively, one or more process blocks of FIG. 5 may be performed by one or more components of device 300 (e.g., processor 320, memory 330, input component 340, output component 350, and/or communication component 360) and/or by one or more components of device 400 (e.g., input component 410, switching component 420, output component 430, and/or controller 440).

As shown in FIG. 5, process 500 may include intercepting a client session associated with a client device and a destination device (block 510). For example, the proxy device may intercept a client session associated with a client device (e.g., a client device 210) and a destination device (e.g., destination device 230), as described above.

As further shown in FIG. 5, process 500 may include allocating a first port of the proxy device as a source port of a proxy session for the client session (block 520). For example, the proxy device may allocate a first port of the proxy device as a source port of a proxy session for the client session, as described above.

As further shown in FIG. 5, process 500 may include determining, based on allocating the first port, whether session information associated with the proxy session would match session information associated with another proxy session (block 530). For example, the proxy device may determine, based on allocating the first port, whether session information associated with the proxy session would match session information associated with another proxy session, as described above.

As further shown in FIG. 5, process 500 may include initiating the proxy session after determining whether the session information associated with the proxy session would match session information associated with another proxy session, wherein a source port of the proxy session is one of: the first port of the proxy device based on a determination that the session information associated with the proxy session would not match session information associated with another proxy session, or a second port of the proxy device based on a determination that the session information associated with the proxy session would match session information associated with another proxy session (block 540). For example, the proxy device may initiate the proxy session after determining whether the session information associated with the proxy session would match session information associated with another proxy session, as described above. In some implementations, a source port of the proxy session is the first port of the proxy device (e.g., based on a determination that the session information associated with the proxy session would not match session information associated with another proxy session). In some implementations, the source port of the proxy session is a second port of the proxy device (e.g., based on a determination that the session information associated with the proxy session would match session information associated with another proxy session).

Process 500 may include additional implementations, such as any single implementation or any combination of implementations described below and/or in connection with one or more other processes described elsewhere herein.

In a first implementation, determining whether the session information associated with the proxy session would match session information associated with another proxy session is performed based on a determination that the first port of the proxy device is allocated to at least one proxy session.

In a second implementation, alone or in combination with the first implementation, process 500 includes storing mapping information that associates the proxy session with the client session.

In a third implementation, alone or in combination with one or more of the first and second implementations, process 500 includes allocating the second port of the proxy device as the source port of the proxy session based on a determination that the session information associated with the proxy session would match session information associated with another proxy session, and determining that the session information associated with the proxy session would not match session information associated with another proxy session.

In a fourth implementation, alone or in combination with one or more of the first through third implementations, the session information associated with the proxy session indicates a source address of the proxy session, the source port of the proxy session, a destination address of the proxy session, a destination port of the proxy session, and a protocol associated with the proxy session.

In a fifth implementation, alone or in combination with one or more of the first through fourth implementations, a source socket of the proxy session matches a source socket of one or more other proxy sessions initiated by the proxy device.

In a sixth implementation, alone or in combination with one or more of the first through fifth implementations, process 500 includes storing the session information associated with the proxy session.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method proxy of oversubscribing for a proxy device, the method comprising:
   intercepting, by the proxy device, a client session associated with a client device and a destination device;
   allocating, by the proxy device, a first port of the proxy device as a source port of first proxy session for the client session;
   determining, by the proxy device and based on allocating the first port and based on a determination of whether the first port of the proxy device has been allocated to at least one proxy session, whether session information associated with the first proxy session would match session information associated with a second proxy session; and
   initiating, by the proxy device, the first proxy session after determining whether the session information associated with the first proxy session would match session information associated with the second proxy session,
   wherein the source port of the first proxy session is one of:

the first port of the proxy device based on a determination that the session information associated with the first proxy session would not match the session information associated with the second proxy session, or a second port of the proxy device based on a determination that the session information associated with the first proxy session would match the session information associated with the second proxy session.

2. The method of claim 1, further comprising storing mapping information that associates the first proxy session with the client session.

3. The method of claim 1, further comprising:
allocating the second port of the proxy device as the source port of the first proxy session based on a determination that the session information associated with the first proxy session would match the session information associated with the second proxy session; and
determining that the session information associated with the first proxy session would not match session information associated with a third proxy session.

4. The method of claim 1, wherein the session information associated with the first proxy session indicates a source address of the first proxy session, the source port of the first proxy session, a destination address of the first proxy session, a destination port of the first proxy session, and a protocol associated with the first proxy session.

5. The method of claim 1, wherein a source socket of the first proxy session matches a source socket of one or more other proxy sessions initiated by the proxy device.

6. The method of claim 1, further comprising storing the session information associated with the first proxy session.

7. A proxy device, comprising:
one or more memories; and
one or more processors to:
intercept a client session associated with a first device and a second device;
allocate a first port of the proxy device as a source port of a first proxy session for the client session associated with the first device and the second device;
determine, based on allocating the first port and based on a determination whether the first port of the proxy device has been allocated to at least one proxy session, whether session information associated with the first proxy session would match session information associated with a second proxy session; and
initiate the first proxy session after determining whether the session information associated with the first proxy session would match the session information associated with the second proxy session,
wherein the source port of the first proxy session is one of:
the first port of the proxy device, based on a determination that the session information associated with the first proxy session would not match session information associated with the second proxy session, or
a second port of the proxy device, based on a determination that the session information associated with the first proxy session would match the session information associated with the second proxy session.

8. The proxy device of claim 7, wherein the one or more processors are further to store mapping information that associates the first proxy session with the client session.

9. The proxy device of claim 7, wherein the one or more processors are further to:
allocate the second port of the proxy device as the source port of the first proxy session based on a determination that the session information associated with the first Proxy session would match the session information associated with the second proxy session; and
determine that the session information associated with the first proxy session would not match session information associated with a third proxy session.

10. The proxy device of claim 7, wherein the session information associated with the first proxy session indicates a source address of the first proxy session, the source port of the first proxy session, a destination address of the first proxy session, a destination port of the first proxy session, and a protocol associated with the first proxy session.

11. The proxy device of claim 7, wherein a source socket of the first proxy session matches a source socket of one or more other proxy sessions initiated by the proxy device.

12. The proxy device of claim 7, wherein the one or more processors are further to store the session information associated with the first proxy session.

13. A non-transitory computer-readable medium storing a set of instructions, the set of instructions comprising:
one or more instructions that, when executed by one or more processors of a proxy device, cause the proxy device to:
intercept a client session associated with a client device and a destination device;
allocate a first port of the proxy device as a source port of a first proxy session for the client session associated with the client device and the destination device;
determine, based on allocating the first port and based on a determination of whether the first port of the proxy device has been allocated to at least one proxy session, whether session information associated with the first proxy session would match session information associated with a second proxy session; and
initiate the first proxy session after determining whether the session information associated with the first proxy session would match session information associated with the second proxy session,
wherein the source port of the first proxy session is one of:
the first port of the proxy device based on determining the session information associated with the first proxy session would not match the session information associated with the second proxy session, or
a second port of the proxy device based on determining the session information associated with the first proxy session would match the session information associated with the second proxy session.

14. The non-transitory computer-readable medium of claim 13, wherein the session information associated with the first proxy session indicates a source address of the first proxy session, the source port of the first proxy session, a destination address of the first proxy session, a destination port of the first proxy session, and a protocol associated with the first proxy session.

15. The non-transitory computer-readable medium of claim 13, wherein the one or more instructions further cause the proxy device to store mapping information that associates the first proxy session with the client session.

16. The non-transitory computer-readable medium of claim 13, wherein the one or more instructions further cause the proxy device to:
- allocate the second port of the proxy device as the source port of the first proxy session based on a determination that the session information associated with the first proxy session would match the session information associated with the second proxy session; and
- determine that the session information associated with the first proxy session would not match session information associated with a third proxy session.

17. The non-transitory computer-readable medium of claim 13, wherein a source socket of the first proxy session matches a source socket of one or more other proxy sessions associated with the proxy device.

* * * * *